United States Patent
Tai et al.

(10) Patent No.: US 11,126,544 B2
(45) Date of Patent: Sep. 21, 2021

(54) METHOD AND APPARATUS FOR EFFICIENT GARBAGE COLLECTION BASED ON ACCESS PROBABILITY OF DATA

(71) Applicant: VIA Technologies, Inc., New Taipei (TW)

(72) Inventors: Ying Yu Tai, Mountain View, CA (US); Jiangli Zhu, San Jose, CA (US)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 15/378,041

(22) Filed: Dec. 14, 2016

(65) Prior Publication Data

US 2018/0165189 A1 Jun. 14, 2018

(51) Int. Cl.
*G06F 12/02* (2006.01)
*G06F 3/06* (2006.01)

(52) U.S. Cl.
CPC .......... *G06F 12/0246* (2013.01); *G06F 3/064* (2013.01); *G06F 3/0608* (2013.01); *G06F 3/0613* (2013.01); *G06F 3/0679* (2013.01); *G06F 2212/7205* (2013.01)

(58) Field of Classification Search
CPC .... G06F 12/0246; G06F 3/0679; G06F 3/064; G06F 3/0652; G06F 3/0608; G06F 3/0647
USPC ... 711/103, E12.008, E12.009, E12.001, 166
See application file for complete search history.

(56) References Cited

U.S. PATENT DOCUMENTS

| | | | |
|---|---|---|---|
| 9,330,009 B1 * | 5/2016 | Throop | G06F 12/0866 |
| 9,672,905 B1 * | 6/2017 | Gold | G11C 11/5628 |
| 10,552,085 B1 * | 2/2020 | Chen | G06F 3/0647 |
| 2006/0004957 A1 * | 1/2006 | Hand | G06F 12/0866 711/113 |
| 2008/0034174 A1 | 2/2008 | Traister et al. | |

(Continued)

FOREIGN PATENT DOCUMENTS

| | | |
|---|---|---|
| CN | 102054534 | 5/2011 |
| CN | 102576293 | 7/2012 |

(Continued)

OTHER PUBLICATIONS

"Notice of Allowance of Taiwan Counterpart Application," dated Aug. 14, 2017, p. 1-p. 4.

(Continued)

*Primary Examiner* — Sanjiv Shah
*Assistant Examiner* — Edward Waddy, Jr.
(74) *Attorney, Agent, or Firm* — JCIPRNET

(57) ABSTRACT

A non-volatile memory (NVM) apparatus and a garbage collection method thereof are provided. The NVM apparatus includes a NVM and a controller. The controller is coupled to the NVM. The controller accesses the NVM according to a logical address of a write command of a host. The controller performs the garbage collection method to release space occupied by invalid data. The garbage collection method includes: grouping a plurality of blocks of the NVM into a plurality of tiers according to hotness of data, moving valid data in one closed source block of a hotter tier among the tiers to one open target block of a cooler tier among the tiers, and erasing the closed source block of the hotter tier to release space.

18 Claims, 5 Drawing Sheets

(56) References Cited

U.S. PATENT DOCUMENTS

| | | | |
|---|---|---|---|
| 2010/0241795 A1 | 9/2010 | Kudo et al. | |
| 2010/0318839 A1 | 12/2010 | Avila et al. | |
| 2011/0107012 A1 | 5/2011 | Kan | |
| 2012/0166749 A1* | 6/2012 | Eleftheriou | G06F 3/0616 |
| | | | 711/165 |
| 2012/0198132 A1 | 8/2012 | Han | |
| 2013/0024609 A1* | 1/2013 | Gorobets | G06F 3/0611 |
| | | | 711/103 |
| 2014/0215129 A1* | 7/2014 | Kuzmin | G06F 12/0246 |
| | | | 711/103 |

FOREIGN PATENT DOCUMENTS

| | | |
|---|---|---|
| CN | 103688246 | 3/2014 |
| TW | 200825738 | 6/2008 |

OTHER PUBLICATIONS

"Office Action of China Counterpart Application", dated Apr. 28, 2019, pp. 1-12.

* cited by examiner

METHOD AND APPARATUS FOR EFFICIENT GARBAGE COLLECTION BASED ON ACCESS PROBABILITY OF DATA

BACKGROUND OF THE INVENTION

Field of the Invention

The invention relates to a memory apparatus, and in particular, a non-volatile memory (NVM) apparatus and a garbage collection method thereof.

Description of Related Art

Compared with conventional hard disk drives, since a flash memory storage device has good read/write performance and has low power consumption, the flash memory is widely used in data storage systems. However, a key factor of writing data into the flash memory is write amplification (WA). The write amplification influences performance and endurance of the flash memory. When a host sends a write command to the flash memory storage device, the flash memory storage device converts (or decodes) the host write command into a plurality of internal write commands/instructions to complete the host write command. The "converting one host write command into a plurality of internal write commands/instructions" is the write amplification. The write amplification is mainly used for an internal write operation, for example, garbage collection, wear leveling and/or other flash management write operations, so as to manage data update and storage endurance.

Write amplification operations mainly concern garbage collection. Garbage collection involves moving valid data in one closed block (referred to as a source block here) to another open block (a block retrieved from a free pool; referred to as a target block here). After garbage collection is completed, a logical block address (LBA) is mapped from the source block to the target block, and the source block is erased and returned to the free pool. The main purpose of garbage collection is to cluster valid data and release memory space occupied by invalid data for new write requests.

The efficiency of garbage collection depends on host write workloads. In actual host write workloads, there are generally some data more frequently accessed and updated. The frequently accessed and updated data are generally referred as hot data. By contrast, accessing and updating of other data are probably less frequent. The less frequently accessed and updated data are generally referred as cold data. In conventional non-volatile memory apparatuses, cold data and hot data are generally mixed together in a same block. Mixing cold data and hot data in the same block generally causes efficiency of garbage collection to decrease, which further results in higher write amplification.

SUMMARY OF THE INVENTION

The invention provides a non-volatile memory (NVM) apparatus and a garbage collection method thereof for enhancing efficiency of garbage collection.

One embodiment of the invention provides a NVM apparatus. The NVM apparatus includes a NVM and a controller. The controller is coupled to the NVM. The controller accesses the NVM according to a logical address of a write command of a host. The controller is configured to perform a garbage collection method to release space occupied by a plurality of invalid data. The garbage collection method includes: grouping a plurality of blocks of the NVM into a plurality of tiers according to hotness of data, moving valid data in one closed source block of a hotter tier among the tiers to one open target block of a cooler tier among the tiers, and erasing the closed source block of the hotter tier to release space.

One embodiment of the invention provides a garbage collection method of a NVM apparatus for releasing space occupied by a plurality of invalid data. The garbage collection method includes: grouping a plurality of blocks of a NVM into a plurality of tiers according to hotness of data; moving valid data in one closed source block of a hotter tier among the tiers to one open target block of a cooler tier among the tiers; and erasing the closed source block of the hotter tier to release space.

In light of the above, the NVM apparatus and the garbage collection method thereof described in the embodiments of the invention group a plurality of blocks into a plurality of tiers according to hotness of data. When one closed source block of a tier (referred to as a hotter tier here) among the tiers requires garbage collection, the controller moves valid data in the closed source block of the hotter tier to one open target block of a cooler tier among the tiers to enhance efficiency of garbage collection. After garbage collection is completed for the closed source block of the hotter tier, the controller erases the closed source block of the hotter tier to release space.

To provide a further understanding of the aforementioned and other features and advantages of the invention, exemplary embodiments, together with the reference drawings, are described in detail below.

DESCRIPTION OF THE EMBODIMENTS

Throughout the text of the specification (including the claims), the term "couple (or connect)" refers to any direct or indirect connection means. For example, where a first device is described to be coupled (or connected) to a second device in the text, it should be interpreted that the first device may be directly connected to the second device, or that the first device may be indirectly connected to the second device through another device or some connection means. Moreover, wherever applicable, elements/components/steps referenced by the same numerals in the figures and embodiments refer to the same or similar parts. Elements/components/steps referenced by the same numerals or the same language in different embodiments may be mutually referred to for relevant descriptions.

Figure 1:
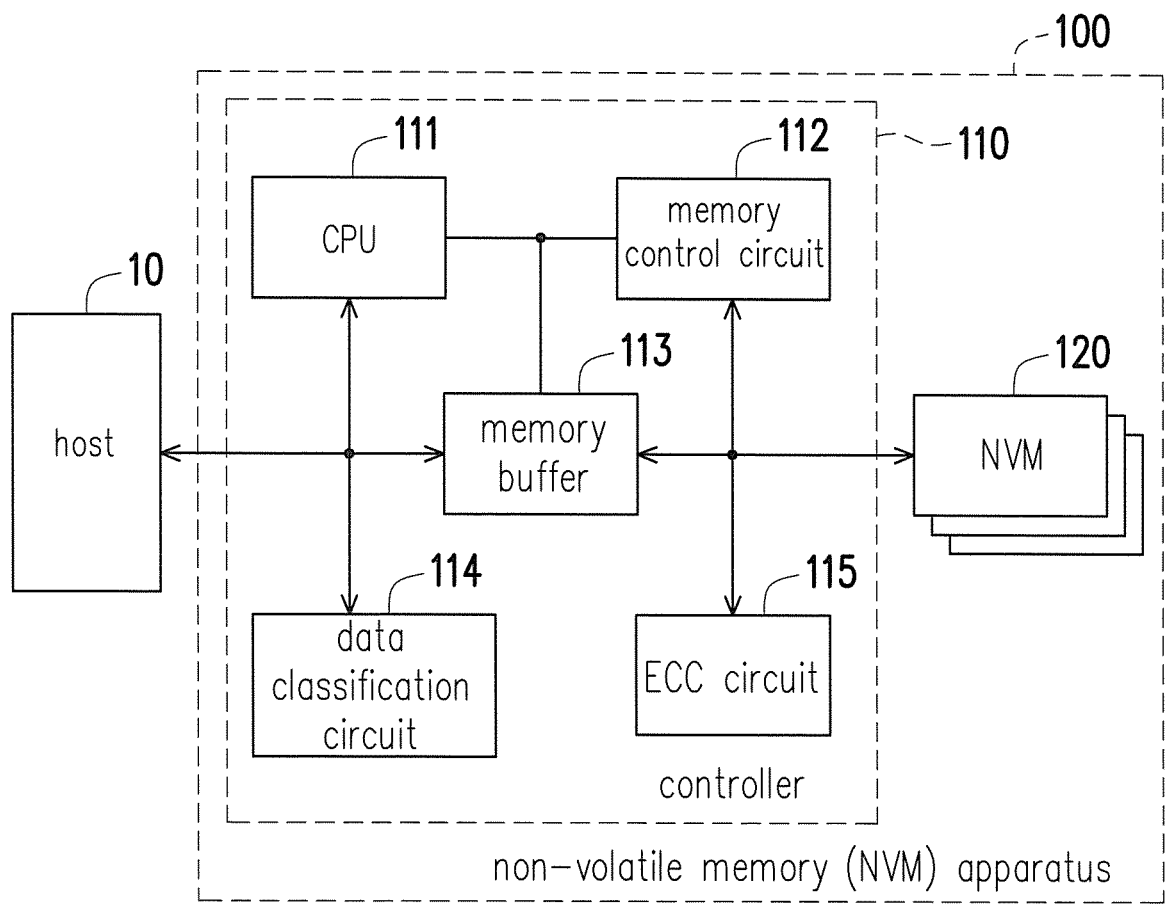
FIG. 1 is a circuit block diagram illustrating a non-volatile memory (NVM) apparatus according to one embodiment of the invention.

FIG. 1 is a circuit block diagram illustrating a non-volatile memory (NVM) apparatus 100 according to one embodiment of the invention. According to the design needs, the NVM apparatus 100 may be a flash drive, a solid state disc (SSD), or another storage apparatus. The NVM apparatus 100 may be coupled to a host 10. The host 10 may be a computer, a handheld phone, a multimedia player, a camera, or another electronic device. The NVM apparatus 100 includes a controller 110 and a NVM 120. According to the design needs, the NVM 120 may be a NAND flash memory or another non-volatile storage circuit/device.

The controller 110 is coupled to the NVM 120. The controller 110 accesses the NVM 120 according to a logical address of a write command of the host 10. In some embodiments, the logical address information may be a logical block address (LBA) or another logical address. The controller 110 performs a "garbage collection method" on the NVM 120 to release space occupied by invalid data. In the embodiment illustrated in FIG. 1, the controller 110 includes a central processing unit (CPU) 111, a memory control circuit 112, a memory buffer 113, a data classification circuit 114, and an error checking and correcting (hereinafter referred to as ECC) circuit 115. The CPU 111 is coupled to the host 10 through a communication interface. According to the design needs, the communication interface includes a small computer system interface (SCSI), a serial attached SCSI (SAS), an enhanced small disk interface (ESDI), a serial advanced technology attachment (SATA), a peripheral component interconnect express (PCI-express), an integrated drive electronics (IDE) interface, a universal serial bus (USB), a thunderbolt interface, or another interface. The present embodiment does not limit the interface structure between the host 10 and the NVM apparatus 100.

When the host 10 sends the write command, data to be written may be temporarily stored in the memory buffer 113, and the CPU 111 converts/decodes the write command (including the logical address) of the host 10 into a corresponding internal control signal (including a physical address of the NVM 120) and provides the internal control signal to the memory control circuit 112 and/or the memory buffer 113. The memory buffer 113 is, for example, a dynamic random access memory (DRAM), a static random access memory (SRAM), or another volatile memory. The ECC circuit 115 may execute an ECC algorithm to encode the data temporarily stored in the memory buffer 113 into a codeword. In some embodiments, the ECC circuit 115 may execute a Bose-Chaudhuri-Hocquengh (BCH) code algorithm, a low density parity check (LDPC) code algorithm, or another ECC algorithm. According to the internal control signal, the memory control circuit 112 may address/control the NVM 120 to write the codeword into the NVM 120.

When the host 10 sends a read command, the CPU 111 converts/decodes the read command (including a logical address) of the host 10 into a corresponding internal control signal (including the physical address of the NVM 120). According to the internal control signal, the memory control circuit 112 may address/control the NVM 120 to read the codeword from the NVM 120. The ECC circuit 115 may execute the ECC algorithm to decode the codeword into data and temporarily store the decoded data in the memory buffer 113. Then, the CPU 111 may transmit the data temporarily stored in the memory buffer 113 back to the host 10.

Figure 2:
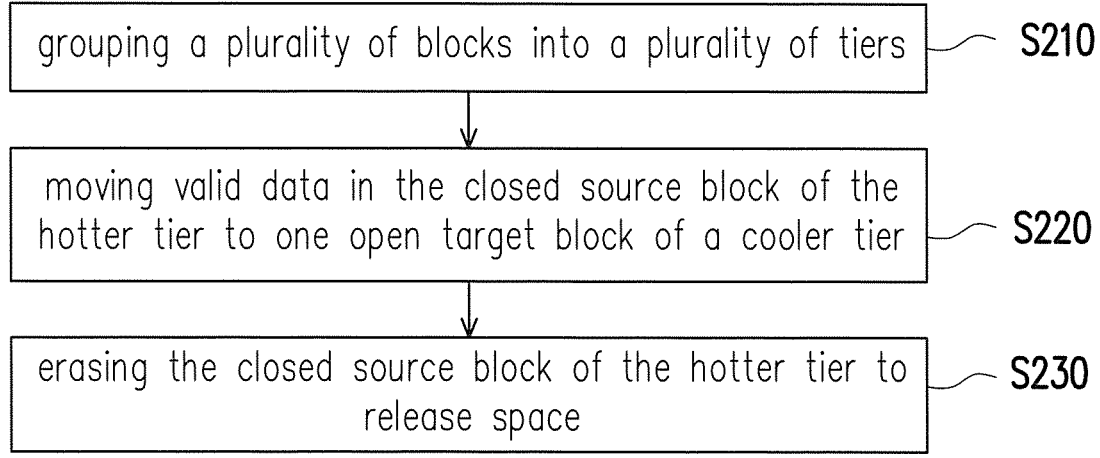
FIG. 2 is a flowchart illustrating a garbage collection method according to one embodiment of the invention.

FIG. 2 is a flowchart illustrating a garbage collection method according to one embodiment of the invention. The concept provided by the present embodiment is a tier-based garbage collection method. Referring to FIG. 1 and FIG. 2, the CPU 111 of the controller 110 groups a plurality of blocks of the NVM 120 into a plurality of tiers according to hotness of data (i.e., a probability for the data to be updated) (step S210). According one algorithm, the CPU 111 determines which closed block among all of the blocks of the NVM 120 requires garbage collection. The present embodiment does not limit the implementation of the one algorithm. For example, the CPU 111 may adopt a conventional algorithm to determine which closed block in the NVM 120 requires garbage collection. When one closed source block of one tier (referred to as a hotter tier here) among the tiers requires garbage collection, the CPU 111 of the controller 110 moves valid data in the closed source block of the hotter tier to one open target block of another tier (a cooler tier) among the tiers (step S220). Specifically, an access probability (access frequency) of data of blocks in the hotter tier is higher than an access probability of data of blocks in the cooler tier. After garbage collection is completed for the closed source block in the hotter tier, the CPU 111 of the controller 110 erases the closed source block of the hotter tier (step S230) to release space occupied by invalid data.

If the closed source block includes less valid data (or if the source block includes more hot data), efficiency of garbage collection will be higher. The plurality of tiers may group all of the blocks of the NVM 120 according to hotness (an access frequency) of data. Since the closed source block in the hotter tier includes hot data (frequently updated data) and does not include cold data, the closed source block includes more invalid data, and efficiency of garbage collection is thus enhanced. In the process of garbage collection, the valid data collected from the closed source block of the hotter tier may generally be treated as data of lower hotness. Accordingly, the CPU 111 may move the valid data in the closed source block of the hotter tier to one open target block of the cooler tier.

Figure 3:
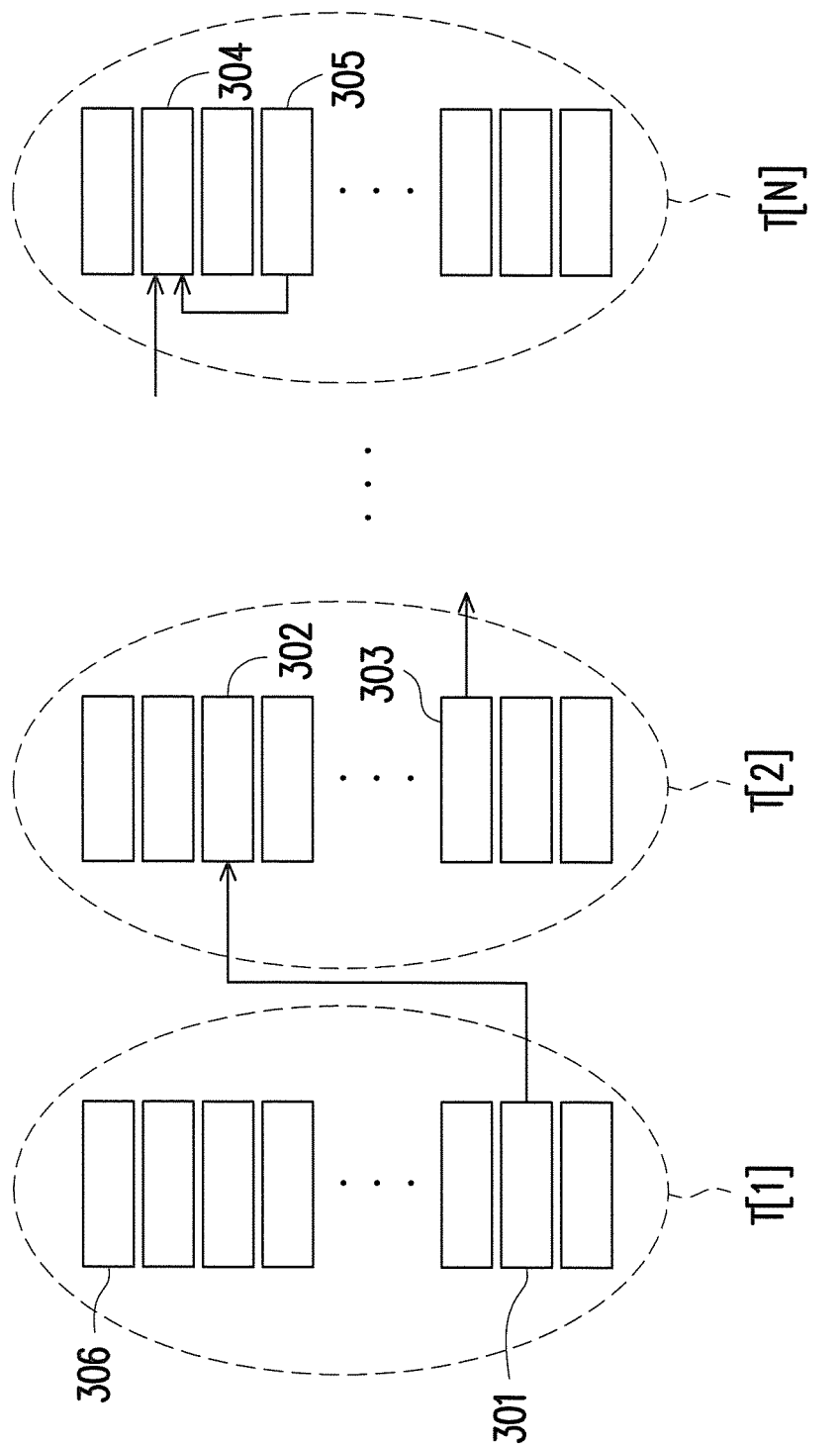
FIG. 3 is a schematic diagram illustrating a plurality of blocks of a NVM 120 grouped into N tiers according to one embodiment of the invention.

FIG. 3 is a schematic diagram illustrating a plurality of blocks of the NVM 120 grouped into N tiers according to one embodiment of the invention. In FIG. 3, a plurality of boxes (e.g., 301 to 306 illustrated in FIG. 3) represent a plurality of blocks of the NVM 120. According to hotness of data, the CPU 111 of the controller 110 groups the plurality of blocks of the NVM 120 into N tiers (e.g., a $1^{st}$ tier T[1], a $2^{nd}$ tier T[2], . . . , and an $N^{th}$ tier T[N] as illustrated in FIG. 3). According to the design needs, N is any integer greater than 1. The sequence of the tiers T[1] to T[N] is determined by the hotness of data. For example, an access probability (an access frequency) of data of blocks in the $1^{st}$ tier T[1] is higher than an access probability of data of blocks in the $2^{nd}$ tier T[2]. In the same way, the access probability (the access frequency) of the data of the blocks in the $2^{nd}$ tier T[2] is higher than an access probability of data of blocks in the $N^{t1}$ tier T[N]. Accordingly, the $1^{st}$ tier T[1] is used to store the hottest data, and the $N^{th}$ tier T[N] is used to store the coldest data.

When one closed source block of an $i^{th}$ tier (a hotter tier) T[i] among the tiers T[1] to T[N] requires garbage collection, the CPU 111 of the controller 110 moves valid data in the closed source block of the $i^{th}$ tier T[i] to one open target block of a $j^{th}$ tier (a cooler tier) T[j] among the tiers T[1] to T[N], wherein i and j are integers, $0 < i < N$, $0 < j \leq N$, and $i < j$. In the embodiment illustrated in FIG. 3, $j = i+1$. In other embodiments, j may be i+2, i+3, or a greater number.

For example, referring to FIG. 3, when a closed source block 301 of the 1$^{st}$ tier T[1] requires garbage collection, the CPU 111 of the controller 110 moves valid data in the closed source block 301 of the 1$^{st}$ tier T[1] (a hotter tier) to an open target block 302 of the 2$^{nd}$ tier T[2] (a cooler tier). After garbage collection is completed for the closed source block 301 of the 1$^{st}$ tier T[1], the CPU 111 of the controller 110 erases the closed source block 301 of the 1$^{st}$ tier T[1] to release space occupied by invalid data. In the same way, when a closed source block 303 of the 2$^{nd}$ tier T[2] requires garbage collection, the CPU 111 of the controller 110 moves valid data in the closed source block 303 of the 2$^{nd}$ tier T[2] (a hotter tier) to one open target block (not illustrated) of a 3$^{rd}$ tier T[3] (a cooler tier, not illustrated). When one closed source block (not illustrated) of an (N−1)$^{th}$ tier T[N−1] (not illustrated) requires garbage collection, the CPU 111 of the controller 110 moves valid data in the closed source block (not illustrated) of the (N−1)$^{th}$ tier T[N−1] (a hotter tier, not illustrated) to an open target block 304 of the N$^{th}$ tier T[N] (a cooler tier). When a closed source block 305 of the N$^{th}$ tier T[N] requires garbage collection, the CPU 111 of the controller 110 moves valid data in the closed source block 305 of the N$^{th}$ tier T[N] to one open target block of the N$^{th}$ tier T[N] (e.g., the open target block 304 or another open target block of the N$^{th}$ tier T[N]).

When the host 10 sends a write command to the NVM apparatus 100, the controller 110 performs an "address classification method" to determine whether a logical address of the write command from the host 10 is a hot data address. The so-called "hot data" refers to data that are very likely to be modified/updated in the near future. After the logical address of the write command of the host 10 is determined to be a hot data address (or a non-hot data address), the controller 110 writes the data of the host 10 into one open target block of a corresponding tier in the NVM 120 according to a determination result and the logical address of the write command. During a process of writing the data into the NVM 120, since "whether the written data are hot data" has been considered, write amplification (WA) can be effectively reduced. For example, the cold data and the hot data are respectively written into open target blocks of different tiers of the NVM 120 based on determination of the hot data address, so that efficiency of a garbage recycling operation can be improved.

Figure 4:
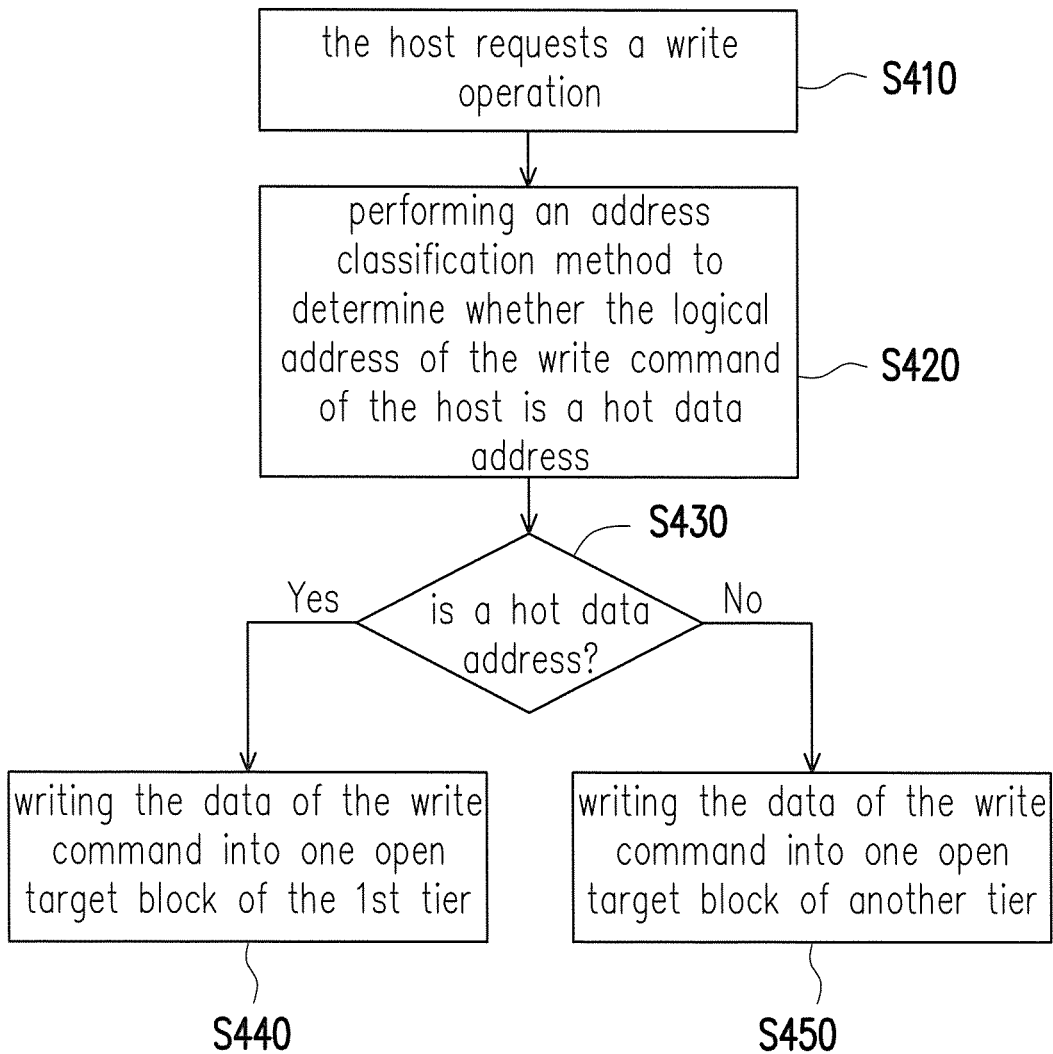
FIG. 4 is a flowchart illustrating writing host data into a corresponding tier according to a result of address classification (data classification) according to one embodiment of the invention.

When the host 10 requests a write operation, data requested to be written will be determined to be hot data or cold data. FIG. 4 is a flowchart illustrating writing host data into a corresponding tier according to a result of address classification (data classification) according to one embodiment of the invention. After the host 10 sends a write command to request a write operation (step S410), the CPU 111 of the controller 110 performs an address classification method according to a logical address of the write command (step S420) to determine whether the logical address of the write command from the host 10 is a hot data address (step S430). The present embodiment does not limit the implementation details of the address classification method performed in step S420. In some embodiments, any address classification method may be performed in step S420 to determine whether the data from the host 10 are hot data or cold data. In other embodiments, the host 10 may send (or imply) hot/cold data information to the NVM apparatus 100, and the controller 110 can know whether the data from the host 10 are hot data or cold data according to the hot/cold data information. In still other embodiments, another address classification method may be performed in step S420 (to be detailed below).

Referring to FIG. 3 and FIG. 4, when logical address of the host 10 is determined to be a hot data address in step S430, the CPU 111 of the controller 110 performs step S440 to write the data of the write command of the host 10 into an open target block 306 of the 1$^{st}$ tier T[1]. When the logical address of the host 10 is determined to be a non-hot data address in step S430, the CPU 111 of the controller 110 performs step S450 to write the data of the write command of the host 10 into one open target block of one corresponding tier among the other tiers T[2] to T[N]. For example (but not limited hereto), in other embodiments, the CPU 111 may write the non-hot data of the host 10 into the open target block 302 in the 2$^{nd}$ tier T[2] (or another open target block in the 2$^{nd}$ tier T[2]). In still other embodiments, the CPU 111 may write the non-hot data of the host 10 into the open target block 304 in the N$^{th}$ tier T[N] (or another open target block in the N$^{th}$ tier T[N]).

In still other embodiments, the address classification method may determine the logical address of the host 10 to be one of M types of data address, wherein M is an integer greater than 2 and M≤N. For example (but not limited hereto), the M types of data address may include a hot data address, a secondary hot data address, a secondary cold data address, and a cold data address.

Figure 5:
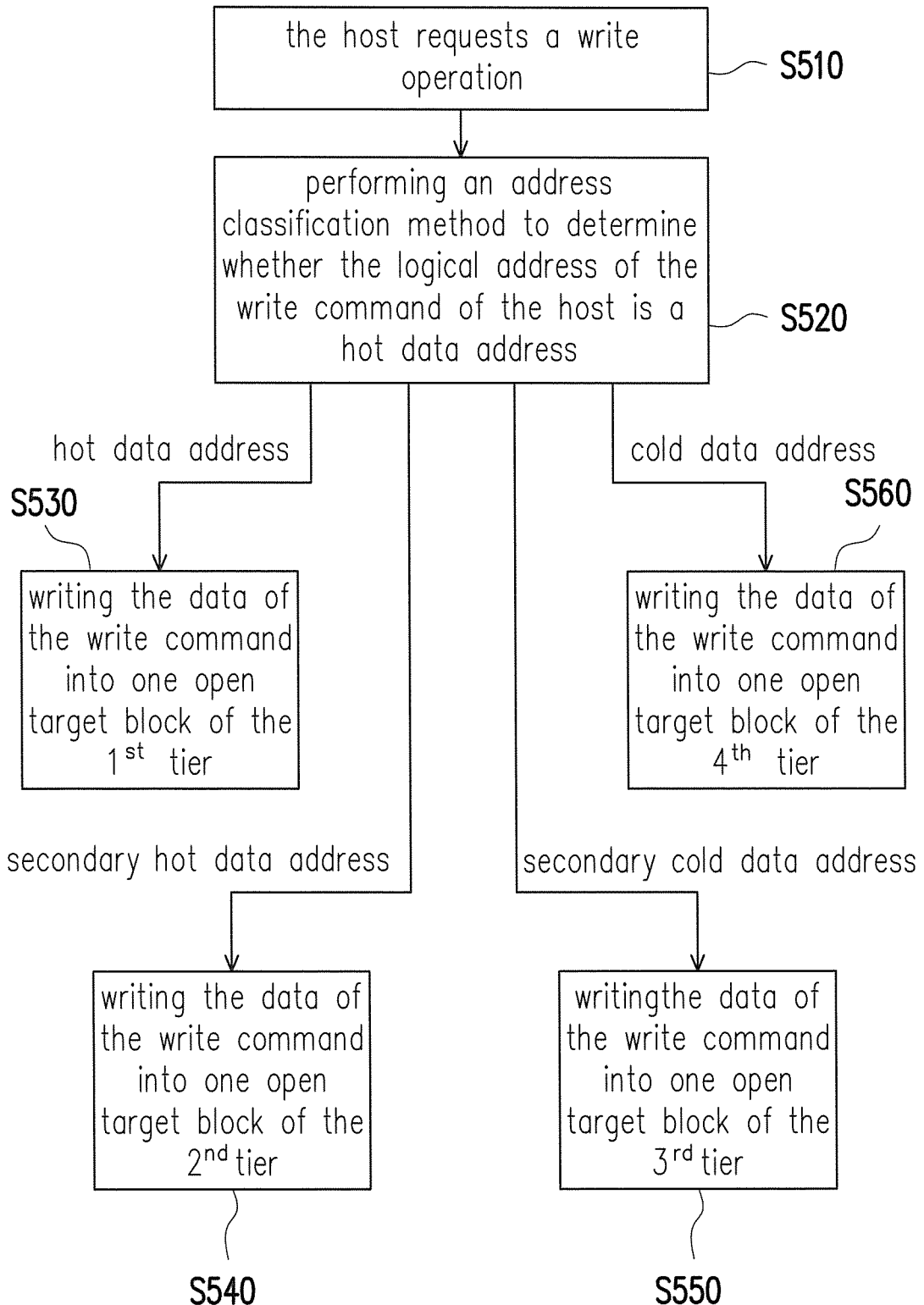
FIG. 5 is a flowchart illustrating writing host data into a corresponding tier according to a result of address classification (data classification) according to another embodiment of the invention.

FIG. 5 is a flowchart illustrating writing host data into a corresponding tier according to a result of address classification (data classification) according to another embodiment of the invention. After the host 10 sends a write command to request a write operation (step S510), the CPU 111 of the controller 110 performs an address classification method according to a logical address of the write command to determine whether the logical address of the write command from the host 10 is a hot data address (step S520).

Specifically, a data classification circuit 114 of the controller 110 provides a data set. The data set may cache one set or a plurality of sets of data entry information to identify the hot data, wherein the data set includes a plurality of data entries, and each of the data entries includes logical address information, a counter value Vc, and a timer value Vt. In some embodiments, the logical address information may be a logical block address (LBA) or another logical address. The CPU 111 may directly use a LBA of the write command of the host 10 to search for a data entry with the same LBA from the data set. In other embodiments, the logical address information may be an identification code having uniqueness. The CPU 111 may convert the logical address of the write command of the host 10 into a corresponding identification code and use the corresponding identification code to search for the data entry with the same identification code from the data set.

The counter value Vc is used for tracking data frequency information of a logical address, i.e., a write frequency of the logical address. The timer value Vt is used for tracking whether data of a logical address are recently accessed, i.e., whether data of the logical address are ever updated within a present time window. The CPU 111 may update a corresponding counter value Vc and a corresponding timer value Vt according to the logical address of the write command of the host 10. When the logical address information of one corresponding data entry in the data set matches the logical address of the write command of the host 10, the data classification circuit 114 of the controller 110 may add the corresponding counter value Vc of the corresponding data entry by one to track the data write frequency, and set the corresponding timer value Vt of the corresponding data entry to a first logic state (for example, logic 1) to represent a recent access. Accordingly, the controller 110 may determine whether the logical address of the write command of the host 10 is a hot data address according to the corresponding counter value Vc and the corresponding timer value Vt.

After the host 10 sends the write command, a host command counter value host_write_count is added by one to count a number of write commands of the host 10. When the host command counter value host_write_count is greater than or equal to a threshold value, the data classification circuit 114 of the controller 110 respectively divides the counter values Vc of each of the data entries by a parameter f, resets the timer values Vt of each of the data entries to a second logic state (for example, logic 0), and resets the host command counter value host_write_count to 0. The parameter f may be determined according to the design needs. For example, the threshold value may be 8,192 or another integer, and the parameter f may be 2 or another real number. Accordingly, in case of every 8,192 host write requests, the counter values Vc of each of the data entries are respectively divided by 2, and the timer values Vt of each of the data entries is reset to the second logic state (for example, to logic 0).

After the host 10 sends the write command, the CPU 111 searches the data set of the data classification circuit 114 according to the logical address of the write command to obtain the corresponding data entry. The CPU 111 obtains the corresponding counter value Vc and the corresponding timer value Vt from the corresponding data entry. When the corresponding counter value Vc exceeds a predetermined range and the corresponding timer value Vt is in the first logic state (for example, logic 1), in step S520, the CPU 111 of the controller 110 determines the logical address of the write command of the host 10 to be a "hot data address". According to the design needs, the predetermined range may be a single boundary range or a double boundary range. For example, in some embodiments, in step S520, it is checked whether the corresponding counter value Vc is greater than a threshold value Th1 (if the corresponding counter value Vc is greater than the threshold value Th1, it represents that the corresponding counter value Vc exceeds the predetermined range), wherein the threshold value Th1 may be determined according to the design needs. In other embodiments, in step S520, it is checked whether the corresponding counter value Vc is smaller than a threshold value Th2 (if the corresponding counter value Vc is smaller than the threshold value Th2, it represents that the corresponding counter value Vc exceeds the predetermined range), wherein the threshold value Th2 may be determined according to the design needs. According to the design needs, the first logic state may be logic 1 or logic 0. For example, in some embodiments, in step S520, it is checked whether the corresponding timer value Vt is logic 1, and the logic 1 represents that data of the corresponding logical address is ever updated within the present time window. In other embodiments, in step S520, it is checked whether the corresponding timer value Vt is logic 0, and the logic 0 represents that data of the corresponding logical address is ever updated within the present time window.

When the corresponding counter value Vc exceeds the predetermined range and the corresponding timer value Vt is in the second logic state (for example, logic 0), in step S520, the CPU 111 of the controller 110 determines the logical address of the write command of the host 10 to be a "secondary hot data address". When the corresponding counter value Vc does not exceed the predetermined range and the corresponding timer value Vt is in the first logic state (for example, logic 1), in step S520, the CPU 111 of the controller 110 determines the logical address of the write command of the host 10 to be a "secondary cold data address". When the corresponding counter value Vc does not exceed the predetermined range and the corresponding timer value Vt is in the second logic state (for example, logic 0), in step S520, the CPU 111 of the controller 110 determines the logical address of the write command of the host 10 to be a "cold data address".

When the logical address of the host 10 is determined to be a "hot data address" in step S520, the data of the write command of the host 10 are written into one open target block of the $1^{st}$ tier T[1] among the tiers T[1] to T[N] in step S530. When the logical address of the host 10 is determined to be a "secondary hot data address" in step S520, the data of the write command of the host 10 are written into one open target block of the $2^{nd}$ tier T[2] among the tiers T[1] to T[N] in step S540. When the logical address of the host 10 is determined to be a "secondary cold data address" in step S520, the data of the write command of the host 10 are written into one open target block of the $3^{rd}$ tier T[3] among the tiers T[1] to T[N] in step S550. When the logical address of the host 10 is determined to be a "cold data address" in step S520, the data of the write command of the host 10 are written into one open target block of the $4^{th}$ tier T[4] among the tiers T[1] to T[N] in step S560.

It shall be noted that, in different applied situations, the relevant functions of the above-described controller 110, CPU 111, memory control circuit 112, data classification circuit 114 and/or ECC circuit 115 may be implemented as software, firmware, or hardware by utilizing common programming languages (e.g., C or C++), hardware description languages (e.g., Verilog HDL or VHDL), or other adequate programming languages. The software (or the firmware) capable of executing the relevant functions may be arranged into any known computer-accessible media such as magnetic tapes, semiconductor memories, magnetic disks, or compact disks (e.g., CD-ROM or DVD-ROM); or the software (or the firmware) may be transmitted via the Internet, a wired communication, a wireless communication, or other communication media. The software (or the firmware) may be stored in the computer-accessible media, so that a computer processor can access/execute programming codes of the software (or the firmware). In addition, the apparatus and the method of the invention can also be implemented by a combination of hardware and software.

Figure 6:
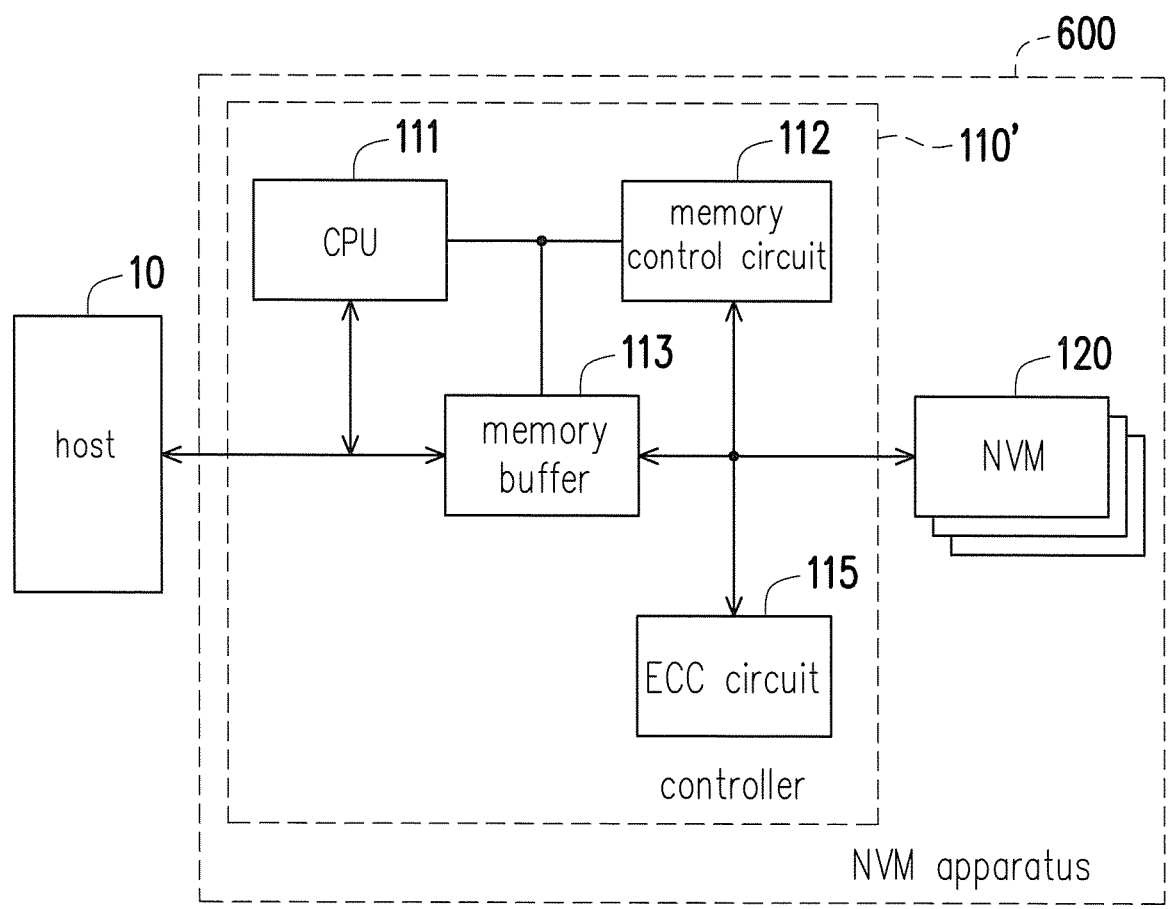
FIG. 6 is a circuit block diagram illustrating a NVM apparatus according to another embodiment of the invention.

For example, FIG. 6 is a circuit block diagram illustrating a NVM apparatus 600 according to another embodiment of the invention. The NVM apparatus 600 includes a controller 110' and a NVM 120. In the embodiment illustrated in FIG. 6, the controller 110' includes a CPU 111, a memory control circuit 112, a memory buffer 113, and an ECC circuit 115. The NVM apparatus 600, the controller 110', the NVM 120, the CPU 111, the memory control circuit 112, the memory buffer 113, and the ECC circuit 115 illustrated in FIG. 6 can be analogously inferred by referring to relevant descriptions of the NVM apparatus 100, the controller 110, the NVM 120, the CPU 111, the memory control circuit 112, the memory buffer 113, and the ECC circuit 115 illustrated in FIG. 1 and shall not be repeatedly described here. In the embodiment illustrated in FIG. 6, the data classification circuit 114 is omitted, and the function of the data classification circuit 114 may be implemented in the CPU 111 by using firmware and/or software.

In summary of the above, the NVM apparatus and the garbage collection method thereof described in the foregoing embodiments group a plurality of blocks into a plurality of tiers according to hotness of data. According to the hotness of data, the controller stores the data to the corresponding tier among the tiers T[1] to T[N]. When one closed source block of an $i^{th}$ tier T[i] (referred to as a hotter tier here) among the tiers T[1] to T[N] requires garbage collection, the controller moves valid data in the closed source block of the $i^{th}$ tier T[i] (a hotter tier) to one open target block of a $j^{th}$ tier T[j] (referred to as a cooler tier here) among the tiers T[1] to T[N]. By separating the cold data and the hot data, the NVM apparatus and the garbage collection method thereof described in the foregoing embodiments may enhance efficiency of garbage collection. Accordingly, the system has lower write amplification (WA) and further achieves more desirable performance and endurance.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A non-volatile memory apparatus comprising:
a flash memory, having a plurality of flash memory blocks; and
a controller, coupled to the flash memory, configured to access the flash memory according to a logical address of a write command of a host and to perform a garbage collection method for releasing space occupied by a plurality of invalid data,
wherein the garbage collection method comprises:
grouping the flash memory blocks in the flash memory into different tiers ranging from a coolest tier storing a coldest data to a hottest tier storing a hottest data according to an access probability of data stored in the flash memory, wherein the different tiers comprise multiple hotter tiers and multiple cooler tiers, and each of the different tiers is a memory block collection including some of the flash memory blocks;
selecting one closed block from one of the hotter tiers of the different tiers within the flash memory as a specific source block, and selecting one open block from one of the cooler tiers of the different tiers within the flash memory as a specific target block;
identifying valid data stored in the specific source block disposed in the one of the hotter tiers within the flash memory;
enhancing efficiency of garbage collection performed in the flash memory by moving the valid data from the specific source block disposed in the one of the hotter tiers within the flash memory to the specific target block disposed in the one of the cooler tiers within the flash memory, wherein each of the hotter tiers and the cooler tiers utilized in the garbage collection method represents the memory block collection selected from the flash memory blocks, and wherein both the hotter tiers and the cooler tiers utilized in the garbage collection method are determined by identifying types of data stored in each of the different tiers without relating to the number of program/erase cycles; and
erasing the closed specific source block disposed in the one of the hotter tiers to release space.

2. The non-volatile memory apparatus according to claim 1, wherein an access probability of data stored in a hotter tier of the hotter tiers is higher than an access probability of data stored in a cooler tier of the cooler tiers.

3. The non-volatile memory apparatus according to claim 2, wherein the different tiers includes N tiers, an $i^{th}$ tier among the N tiers is selected as the hotter tier, and one of an $(i+1)^{th}$ tier to a $N^{th}$ tier among the N tiers is selected as the cooler tier, wherein N and i are integers, 0<i<N.

4. The non-volatile memory apparatus according to claim 3, wherein the garbage collection method further comprises:
moving valid data in one closed source block of the $N^{th}$ tier to one open target block of the $N^{th}$ tier.

5. The non-volatile memory apparatus according to claim 3, wherein the controller is configured to perform an address classification method to determine whether the logical address of the write command from the host is a hot data address, and data of the write command are written into one open target block of a $1^{st}$ tier among the N tiers when the logical address is determined to be the hot data address, wherein an access probability of data stored in the $1^{st}$ tier is higher than an access probability of data stored in any one tier among the N tiers.

6. The non-volatile memory apparatus according to claim 5, wherein when the logical address is determined to be a non-hot data address, the data of the write command are written into one open target block of one corresponding tier among a $2^{nd}$ tier to the $N^{th}$ tier.

7. The non-volatile memory apparatus according to claim 5, wherein the address classification method is used to determine whether the logical address is one of M types of data addresses, wherein M is an integer and M≤N.

8. The non-volatile memory apparatus according to claim 7, wherein the M types of data addresses comprise the hot data address, a secondary hot data address, a secondary cold data address, and a cold data address.

9. The non-volatile memory apparatus according to claim 8, wherein the data of the write command are written into one open target block of a $2^{nd}$ tier among the N tiers when the logical address is determined to be the secondary hot data address, the data of the write command are written into one open target block of a 3rd tier among the N tiers when the logical address is determined to be the secondary cold data address, and the data of the write command are written into one open target block of a 4th tier among the N tiers when the logical address is determined to be the cold data address.

10. A garbage collection method of a non-volatile memory apparatus for releasing space occupied by a plurality of invalid data, the garbage collection method comprising:
grouping flash memory blocks in a flash memory of the non-volatile memory apparatus into different tiers ranging from a coolest tier storing a coldest data to a hottest tier storing a hottest data according to an access probability of data stored in the flash memory, wherein the different tiers comprise multiple hotter tiers and multiple cooler tiers, and each of the different tiers is a memory block collection including some of the flash memory blocks;
selecting one closed block from one of the hotter tiers of the different tiers within the flash memory as a specific source block, and selecting one open block from one of the cooler tiers of the different tiers within the flash memory as a specific target block;
identifying valid data stored in the specific source block disposed in the one of the hotter tiers within the flash memory;
enhancing efficiency of garbage collection performed in the flash memory by moving the valid data from the specific source block disposed in the one of the hotter tiers within the flash memory to the specific target block disposed in the one of the cooler tiers within the flash memory, wherein each of the hotter tiers and the cooler tiers utilized in the garbage collection method represents the memory block collection selected from the flash memory blocks, and wherein the hotter tiers and the cooler tiers utilized in the garbage collection method are determined by identifying types of data stored in each of the different tiers without relating to the number of program/erase cycles; and erasing the closed specific source block disposed in the one of the hotter tiers to release space.

11. The garbage collection method according to claim 10, wherein an access probability of data stored in a hotter tier of the hotter tiers is higher than an access probability of data stored in a cooler tier of the cooler tiers.

12. The garbage collection method according to claim 11, wherein the different tiers includes N tiers, an $i^{th}$ tier among the N tiers is selected as the hotter tier, and one of an $(i+1)^{th}$ tier to a $N^{th}$ tier among the N tiers is selected as the cooler tier, wherein N and i are integers, $0<i<N$.

13. The garbage collection method according to claim 12, further comprising:

moving valid data in one closed source block of the $N^{th}$ tier to one open target block of the $N^{th}$ tier.

14. The garbage collection method according to claim 12, further comprising:

performing an address classification method to determine whether a logical address of a write command from a host is a hot data address; and writing data of the write command into one open target block of a $1^{st}$ tier among the N tiers when the logical address is determined to be the hot data address, wherein an access probability of data stored in the $1^{st}$ tier is higher than an access probability of data stored in any one tier among the N tiers.

15. The garbage collection method according to claim 14, further comprising:

writing the data of the write command into one open target block of one corresponding tier among a $2^{nd}$ tier to the $N^{th}$ tier when the logical address is determined to be a non-hot data address.

16. The garbage collection method according to claim 14, wherein the address classification method is used to determine whether the logical address is one of M types of data addresses, wherein M is an integer and $M \leq N$.

17. The garbage collection method according to claim 16, wherein the M types of data addresses comprise the hot data address, a secondary hot data address, a secondary cold data address, and a cold data address.

18. The garbage collection method according to claim 17, further comprising:

writing the data of the write command into one open target block of a $2^{nd}$ tier among the N tiers when the logical address is determined to be the secondary hot data address;

writing the data of the write command into one open target block of a $3^{rd}$ tier among the N tiers when the logical address is determined to be the secondary cold data address; and writing the data of the write command into one open target block of a $4^{th}$ tier among the N tiers when the logical address is determined to be the cold data address.

* * * * *